US008848364B2

(12) United States Patent
Crane et al.

(10) Patent No.: US 8,848,364 B2
(45) Date of Patent: Sep. 30, 2014

(54) DAUGHTERBOARD HAVING AIRFLOW PATH

(75) Inventors: Robert Lee Crane, Fort Collins, CO (US); Tom J. Searby, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 145 days.

(21) Appl. No.: 13/440,891

(22) Filed: Apr. 5, 2012

(65) Prior Publication Data
US 2013/0265713 A1  Oct. 10, 2013

(51) Int. Cl.
G06F 1/20 (2006.01)

(52) U.S. Cl.
USPC ...... 361/679.51; 361/690; 361/692; 361/694; 361/695; 361/719

(58) Field of Classification Search
CPC ...................................... G06F 1/185
USPC ............ 361/679.51, 690, 692, 694, 695, 719, 361/720, 721
See application file for complete search history.

(56) References Cited

U.S. PATENT DOCUMENTS

| | | | | |
|---|---|---|---|---|
| 5,079,438 A * | 1/1992 | Heung | ......................... | 307/141 |
| 5,949,645 A | 9/1999 | Aziz et al. | | |
| 6,134,104 A * | 10/2000 | Mohi et al. | ............... | 361/679.33 |
| 6,315,031 B1 * | 11/2001 | Miyahara et al. | ............ | 165/80.3 |
| 6,411,511 B1 * | 6/2002 | Chen | ............................. | 361/697 |
| 6,466,448 B1 | 10/2002 | Baik | | |
| 6,697,255 B1 * | 2/2004 | Banton et al. | .................. | 361/690 |
| 6,702,000 B2 * | 3/2004 | Miyahara et al. | ............ | 165/80.3 |
| 6,989,988 B2 * | 1/2006 | Arbogast et al. | .............. | 361/695 |
| 7,215,543 B2 * | 5/2007 | Arbogast et al. | .............. | 361/695 |
| 7,244,141 B2 * | 7/2007 | Yamane et al. | ................ | 439/485 |
| 7,804,030 B2 * | 9/2010 | Friedrich et al. | .............. | 174/252 |
| 7,813,121 B2 * | 10/2010 | Bisson et al. | ............ | 361/679.51 |
| 7,843,685 B2 * | 11/2010 | Beauchamp et al. | ..... | 361/679.49 |
| 7,864,541 B2 * | 1/2011 | Lucero et al. | ................. | 361/752 |
| 8,009,417 B2 * | 8/2011 | Searby et al. | ............. | 361/679.5 |
| 8,320,121 B2 * | 11/2012 | Bisson et al. | ............ | 361/679.51 |
| 2003/0117782 A1 | 6/2003 | Wrycraft et al. | | |
| 2005/0128707 A1 * | 6/2005 | Sanders et al. | ................ | 361/703 |
| 2005/0207134 A1 * | 9/2005 | Belady et al. | ................. | 361/796 |
| 2006/0012957 A1 * | 1/2006 | Arbogast et al. | .............. | 361/695 |
| 2006/0087813 A1 | 4/2006 | Becker et al. | | |
| 2008/0174968 A1 * | 7/2008 | Feng et al. | ..................... | 361/720 |
| 2011/0026219 A1 * | 2/2011 | Wiltzius et al. | .......... | 361/679.47 |
| 2011/0051358 A1 * | 3/2011 | Searby et al. | ............. | 361/679.48 |
| 2012/0033385 A1 * | 2/2012 | Nagasawa | ..................... | 361/721 |
| 2012/0215956 A1 * | 8/2012 | Zeng et al. | ..................... | 710/301 |
| 2012/0287571 A1 * | 11/2012 | Santos | ..................... | 361/679.48 |

FOREIGN PATENT DOCUMENTS

| | | | |
|---|---|---|---|
| EP | 0578394 | A2 | 1/1994 |
| EP | 0735810 | A2 | 10/1996 |
| EP | 1918801 | A1 | 5/2008 |

* cited by examiner

*Primary Examiner* — David M Sinclair
*Assistant Examiner* — Robert Brown
(74) *Attorney, Agent, or Firm* — Chris Ferguson

(57) ABSTRACT

A daughterboard can include an airflow path or opening.

17 Claims, 8 Drawing Sheets

US 8,848,364 B2

DAUGHTERBOARD HAVING AIRFLOW PATH

BACKGROUND

Computing devices, such as desktop computers and workstation computers, can have many components. A computing device often has a central printed circuit board known as the motherboard, mainboard, system board, or logic board (referred to herein as "motherboard"). The motherboard may include various components, such as a central processing unit and memory. The motherboard may also support additional components, devices, and the like. For example, the motherboard may support an additional printed circuit board. The additional printed circuit board can extend the functionality of the motherboard and is often called a daughterboard, daughtercard, piggyback board, or riser card (referred to herein as "daughterboard"). Accordingly, the daughterboard may provide an upgrade path for upgrading the functionality and performance of the computing device.

BRIEF DESCRIPTION OF DRAWINGS

The following detailed description refers to the drawings, wherein.

DETAILED DESCRIPTION

Manufacturers of computing devices are challenged with creating computing devices that are configurable and high performing. Including a daughterboard can enable a manufacturer to extend the functionality and performance of a computing device.

According to an embodiment, a computer chassis can include a Peripheral Component Interconnect (PCI) card area. The PCI card area can include one or more components that generate heat during operation. Accordingly, the chassis can include an intake fan to blow air across the PCI card area to dissipate the generated heat. The chassis can also include an exhaust fan to evacuate air from the chassis. The chassis may further include a daughterboard that separates the PCI card area from the exhaust fan. The daughterboard may include an opening to permit the intake air to pass toward the exhaust fan. The opening may take many forms, such as a space formed somewhere in the daughterboard or defined by an angled edge of the daughterboard. The opening may also comprise multiple openings, such as small perforations, larger apertures, slots, louvre-like openings, or the like.

As a result of this configuration, a convenient and efficient airflow path for the intake air may be provided, which can improve the cooling capability of the computer chassis. This may provide multiple advantages and benefits, such as allowing the fans to operate less and at lower speeds. This can save energy, extend fan life, and reduce the noise generated by the fans, thus improving the user experience. Additionally, the functionality of the computing device may be extended via the daughterboard, thus providing more flexibility, performance, and user satisfaction. Further details of this embodiment and associated advantages, as well as of other embodiments, will be discussed in more detail below with reference to the drawings.

Figure 1A:
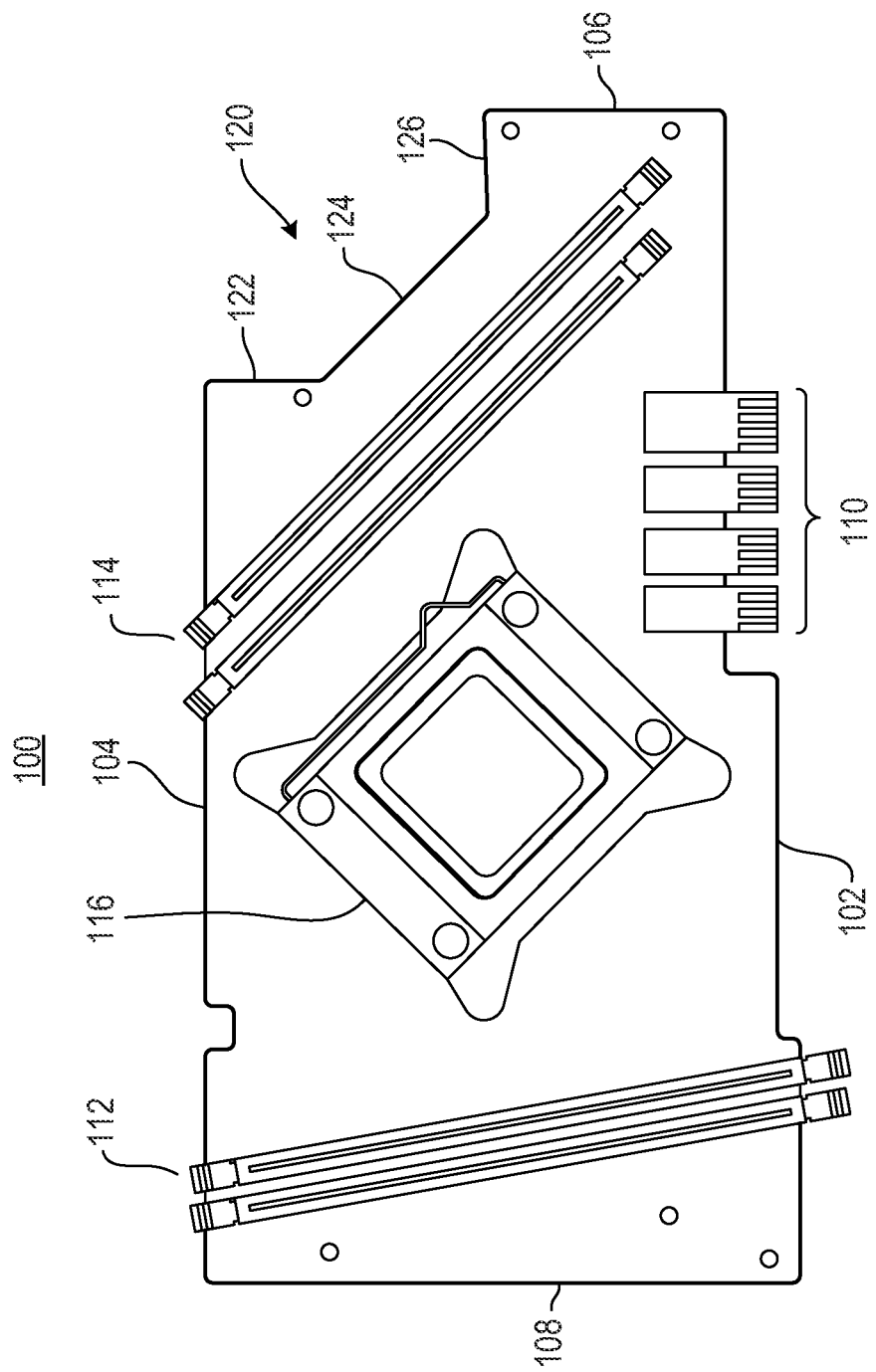
FIGS. 1A-1C illustrate a daughterboard having different types of openings that may provide an airflow path, according to an example.
Figure 1B:
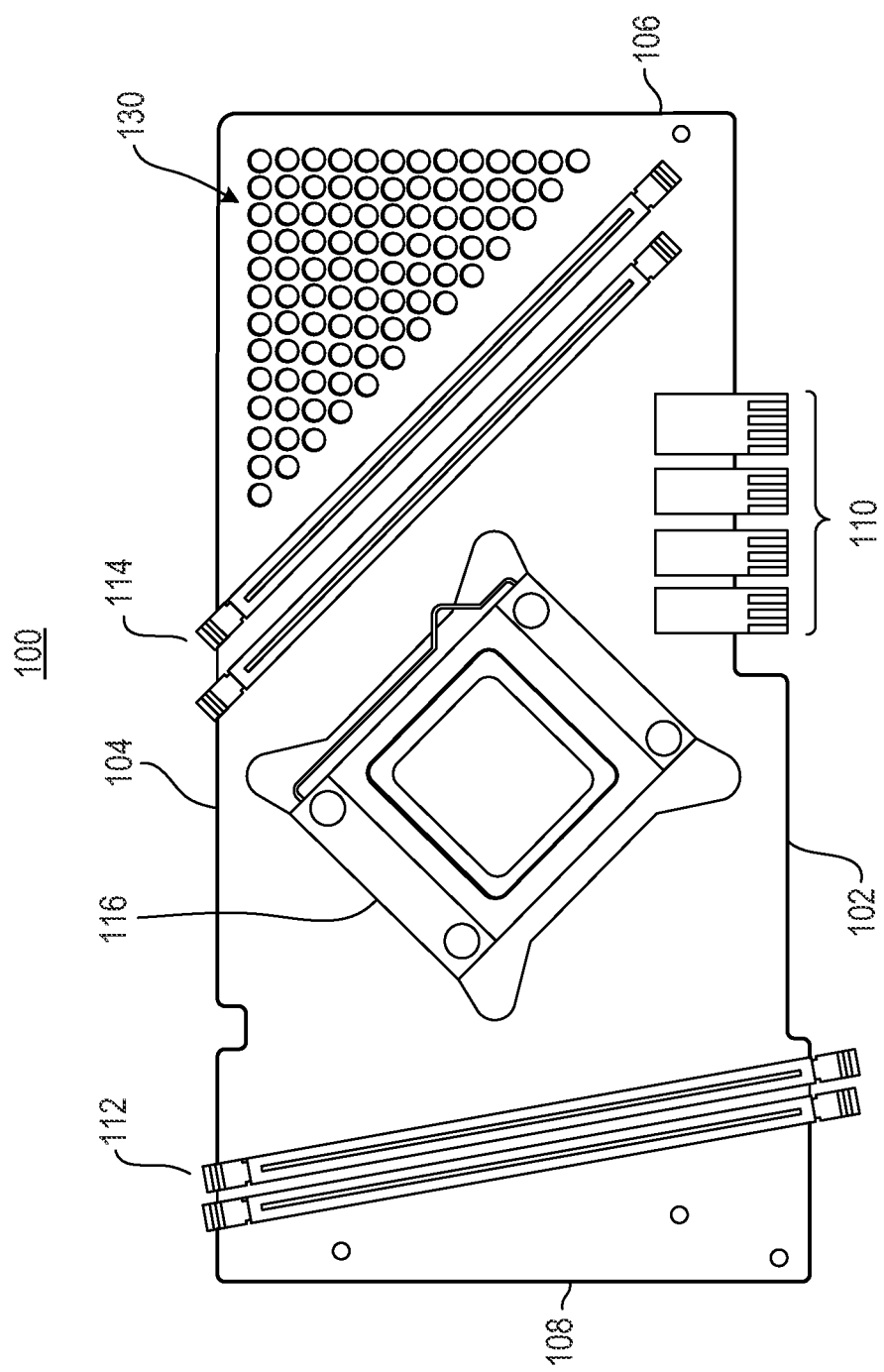
Figure 1C:
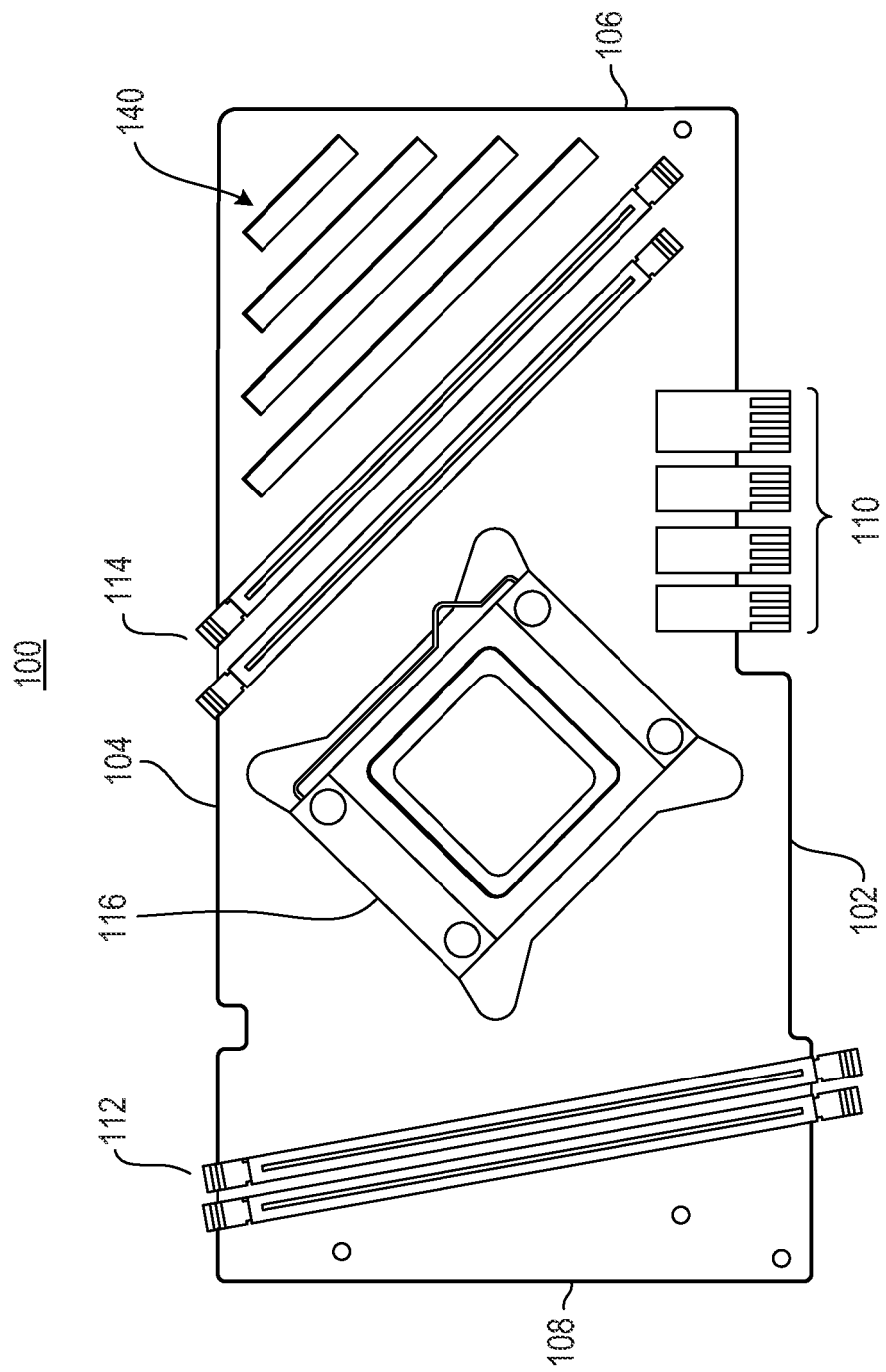

Referring now to the drawings, FIGS. 1A-1C illustrate a daughterboard 100, according to several examples. Daughterboard 100 may also be called a daughtercard or a piggyback board. In some examples, daughterboard 100 may be a standard expansion board or other printed circuit board. Daughterboard 100 may be a printed circuit board and may be constructed of various materials. For example, daughterboard 100 may include a substrate constructed of a non-conductive material The daughterboard may mechanically support and electrically connect various electrical components. The components may be connected via conductive pathways, tracks, or signal traces constructed of a conductive material such as copper, which can be etched and laminated onto the substrate.

Daughterboard 100 may have a bottom edge 102, a top edge 104, a first side edge 106, and a second side edge 108. Daughterboard 100 may include a connector 110 on the bottom edge 102 to connect the daughterboard to another device. For example, the other device may have a printed circuit board, such as a motherboard, which the daughterboard can connect to. A motherboard may also be called a mainboard, system board, or logic board.

Connector 110 may be any of various connectors for connecting the daughterboard to the motherboard. The motherboard may have a corresponding connector for receiving connector 110. By connecting daughterboard 100 to another device via connector 110, the functionality of the device may be extended via the various electrical components provided by the daughterboard 100.

Daughterboard 100 may include and/or support one or more components. For example, daughterboard 100 may include various plugs, sockets, pins, connectors, or other attachments for connecting to one or more electrical components. For instance, memory connectors 112, 114 may receive various memory cards. Additionally, processor 116, which may be a central processing unit or graphic processing unit, may be supported by daughterboard 100. Daughterboard 100 may include additional components beyond those illustrated in FIGS. 1A-1C.

Daughterboard 100 may include an airflow path, such as airflow paths 120, 130, 140. The airflow path may take various forms. For example, the airflow path can be an opening, aperture, or cutaway. Additionally, the airflow path may include multiple openings, apertures, or cutaways. The airflow path may be provided in an area of the daughterboard 100 that may facilitate efficient and effective movement of the air. For instance, the airflow path may be provided at a portion of the daughterboard 100 close to an exhaust outlet of a computer chassis or to a fan that assists in the movement of air.

In FIG. 1A, the airflow path may be provided by a cutaway 120, though it may also be referred to as an opening. The cutaway may take various forms. For instance, the cutaway 120 may include a vertical portion 122, an angled portion 124, and a horizontal portion 126. Each of the portions 122, 124, and 126 may be considered to be portions of the top edge 104. The vertical portion 122 may precede the angled portion 124 and may proceed toward the bottom edge 102 at an angle of 90 degrees relative to the bottom edge 102. The angled portion 124 may angle toward the bottom edge 102 as the top edge 104 approaches the first side edge 106. The horizontal portion 126 may be parallel to the bottom edge 102 and may end when the top edge 104 reaches the first side edge 106.

In some examples, the cutaway may include less than all of these portions, more than one of each, or some combination. For instance, the cutaway may include only a vertical portion, such as by cutting the daughterboard short, or only an angled portion. Additionally, different angles may be used for the portions 122, 124, 126 or the cutaway may instead have curved or round edges, like a semi-circle for example. As a result of the cutaway 120, an area that would otherwise have been occupied by the daughterboard may be open, thus providing an airflow path through or past the daughterboard.

In FIG. 1B, the airflow path may be provided by multiple openings, such as perforations 130. The perforations 130 may be spaced close together to provide a larger airflow path in a particular area of the daughterboard. In some examples, the multiple openings may be larger, spaced further apart, or both. In some examples, the airflow path can include only a single opening large enough to permit air to pass through or by the daughterboard.

In FIG. 1C, the multiple openings may be slots 140. The slots 140 may be spaced close together to provide a larger airflow path in a particular area of the daughterboard. In some examples, the slots may be larger, spaced further apart, or both. In some examples, the airflow path can include only a single slot large enough to permit air to pass through or by the daughterboard.

Cutaway 120, perforations 130, and slots 140 are merely examples of an airflow path. Other types of openings and pathways may be used, and other configurations are possible. For instance, the airflow path can be located in other areas of daughterboard 100.

Figure 2:
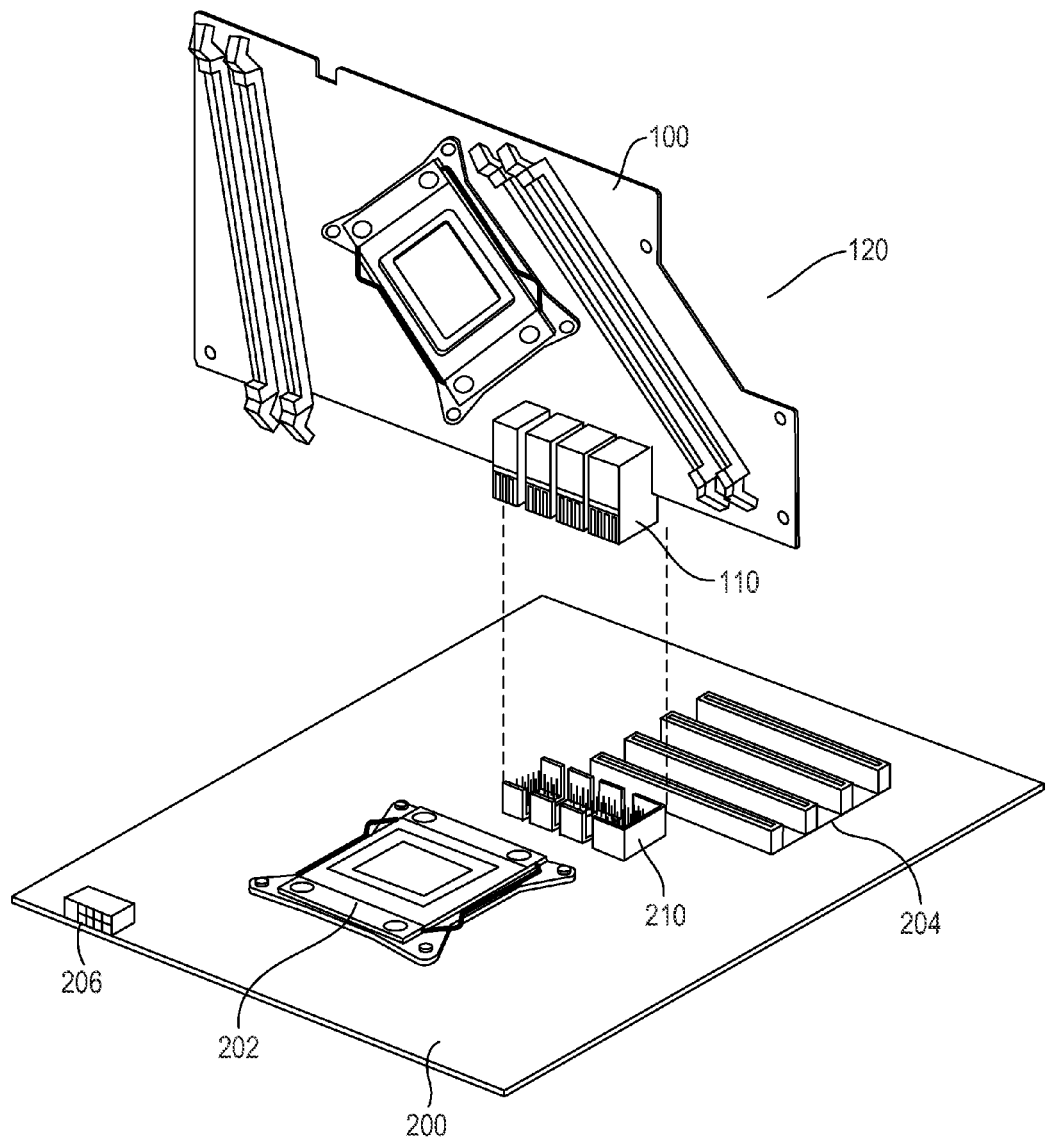
FIG. 2 illustrates a daughterboard with an airflow path connecting to a motherboard, according to an example.

FIG. 2 illustrates a daughterboard with an airflow path connecting to a motherboard, according to an example. Daughterboard 100 may correspond to daughterboard 100 in FIGS. 1A, 1B, or 1C. Motherboard 200 may be a printed circuit board and may serve as the primary circuit board for a computer. Motherboard 200 may include various components, such as a processor 202, PCI connectors 204, and a power connector 206. Motherboard 200 may include various other components as well.

Motherboard 200 may also include a connector 210 for mating to connector 110 of daughterboard 100. When daughterboard 100 is connected to motherboard 200, the daughterboard 100 may separate the motherboard 200 into two portions. The portion of the motherboard 200 with PCI connectors 204 may be called a PCI card area. The cutaway 120 may provide an airflow path from the PCI card area to the other side of the motherboard 200. Accordingly, as will be discussed later with reference to FIG. 6, cooling air passing over the PCI card area may pass through or past daughterboard 100 to the other side of the motherboard 200 instead of being obstructed by the daughterboard 100 and trapped in the PCI card area.

Figure 3:
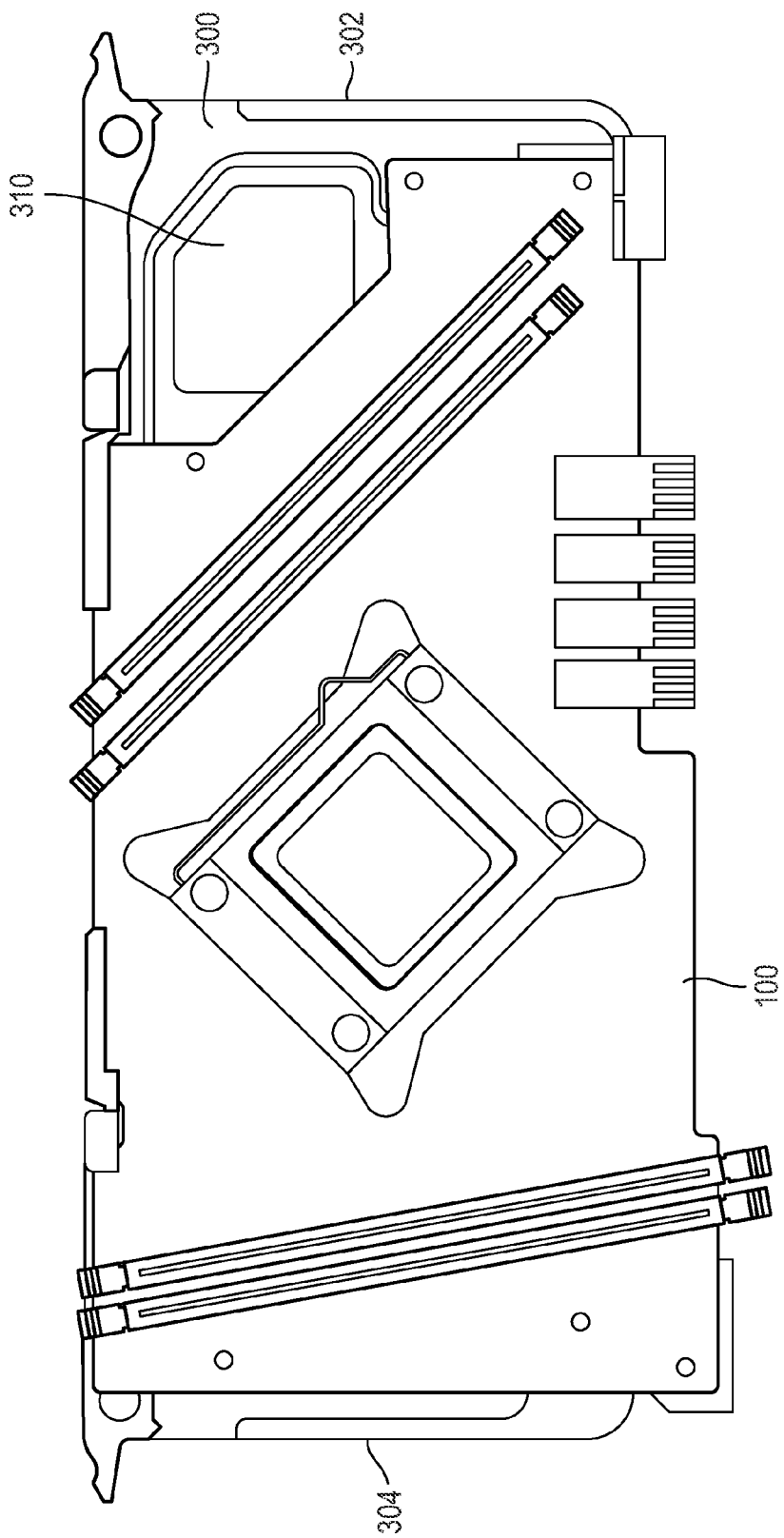
FIG. 3 illustrates a daughterboard and tray providing an airflow path, according to an example.

FIG. 3 illustrates a daughterboard and tray providing an airflow path, according to an example. Daughterboard 100 may correspond to daughterboard 100 in FIGS. 1A, 1B, or 1C. Tray 300 may be configured to receive and support daughterboard 100. Tray 300 may be constructed of various materials. For example, tray 300 may be constructed of a metal, a plastic, or a combination of both. Generally, the stronger and more rigid the material used to construct tray 300, the better supporting capability the tray will have.

Tray 300 may provide rigidity and structural support so that daughterboard 100 can be kept firmly connected to a motherboard or other device. To assist in this function, tray 300 may include features, such as connectors, snaps, fasteners, screws, or the like, to connect to daughterboard 100. Additionally, tray 300 may include similar features to securely connect to a motherboard and/or a computer chassis. In some examples, edges 302 and 304 of tray 300 may be able to slide into receivers on a computer chassis.

Tray 300 may include an opening 310 so as not to impede the airflow path provided by the daughterboard. Accordingly, opening 310 may overlap the portion of daughterboard 100 that provides the airflow path. For example, opening 310 can overlap the cutaway 120 in daughterboard 100. Similarly, opening 310 could be configured to overlap any other opening, aperture, cutaway, or the like, of daughterboard 100 so as to not obstruct the airflow path.

Figure 4:
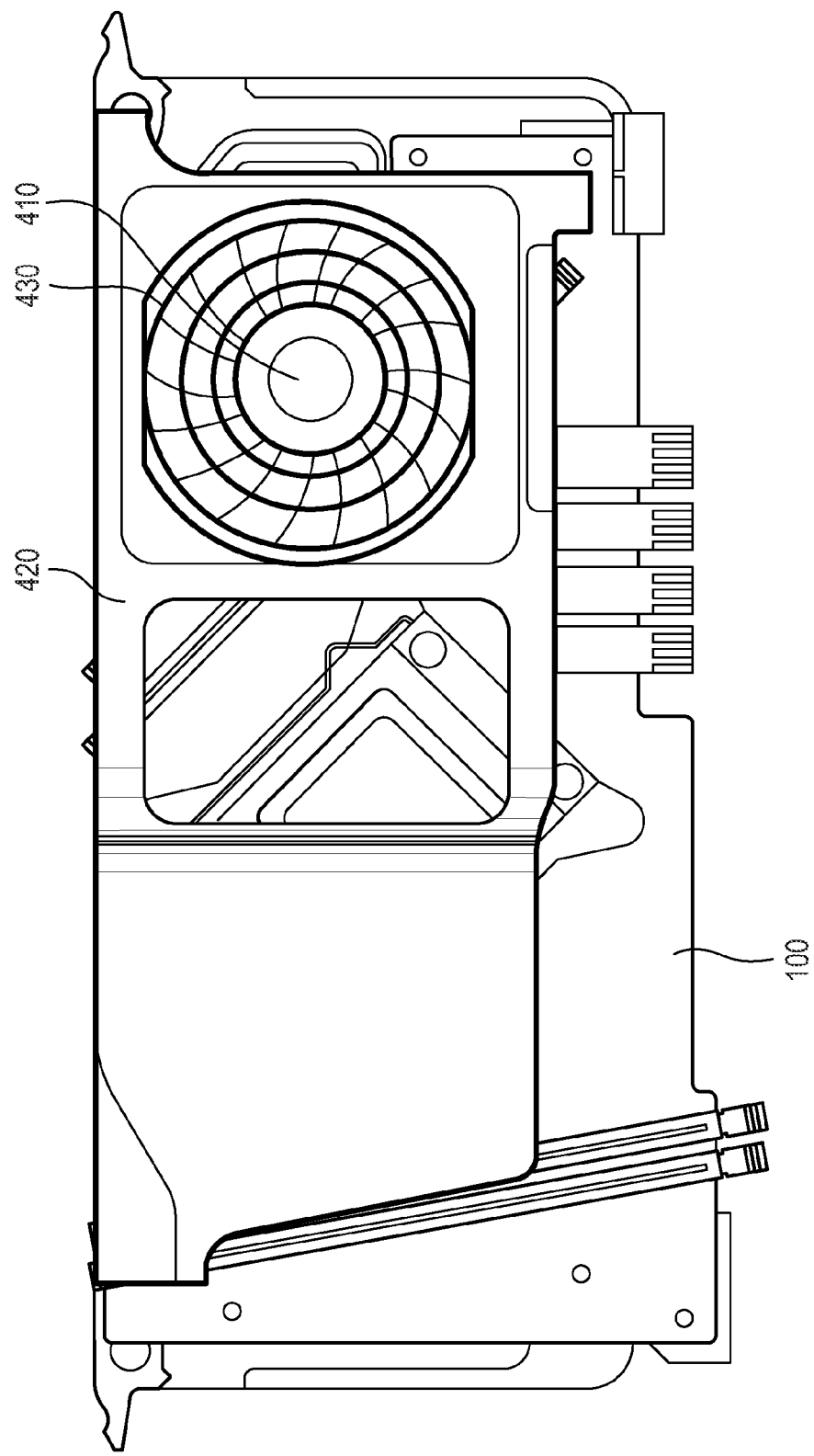
FIG. 4 illustrates a daughterboard and tray with an attached fan, according to an example.

FIG. 4 illustrates a daughterboard and tray with an attached fan, according to an example. Daughterboard 100 may correspond to daughterboard 100 in FIGS. 1A, 1B, or 1C, and tray 300 may correspond to tray 300 in FIG. 3. Fan 410 may be any of various fans. For example, fan 410 may be an axial-flow fan, a centrifugal fan, or a crossflow fan. Fan 410 may be provided to cool one or more electronic components housed on daughterboard 100, such as a memory, and may have the beneficial side effect of assisting the flow of air through the airflow path. Alternatively, fan 410 can be intentionally or exclusively provided to assist with the flow of air through the airflow path.

Fan 410 may be supported by assembly 420, which may be a duct assembly. Assembly 420 may be constructed of various materials. For example, assembly 420 may be constructed of a plastic. Assembly 420 may attach to the tray 300. For example, assembly 420 may attach to tray 300 via one or more connectors or other attachment features. Assembly 420 may include an opening 430 to allow air to flow out of the assembly 420. In some examples, fan 410 may not be supported by assembly 420 and may instead be attached directly to one or more electronic components on daughterboard 100 or to a heatsink associated with one or more electronic components on daughterboard 100.

Figure 5:
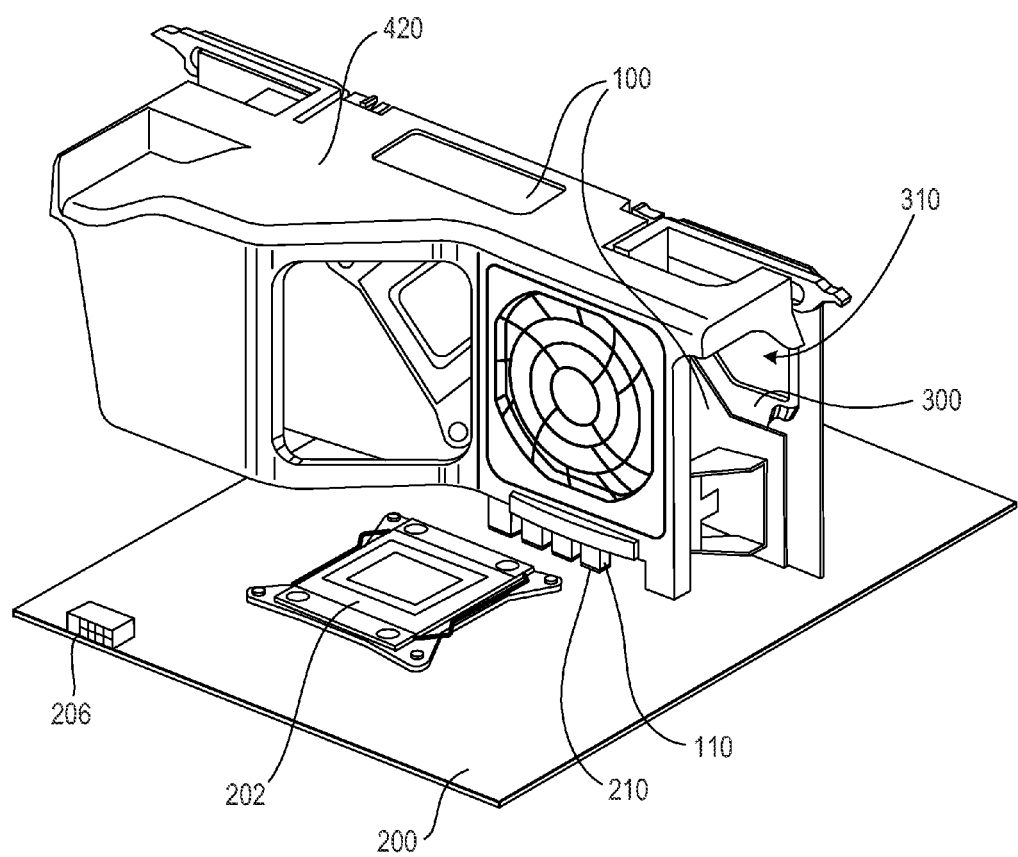
FIG. 5 illustrates a daughterboard, tray, and fan connected to a motherboard, according to an example.

FIG. 5 illustrates a daughterboard, tray, and fan connected to a motherboard, according to an example. The daughterboard 100, tray 300, and fan assembly 420 may correspond to the assembly illustrated in FIG. 4. Motherboard 200 may correspond to the motherboard 200 in FIG. 2.

Figure 6:
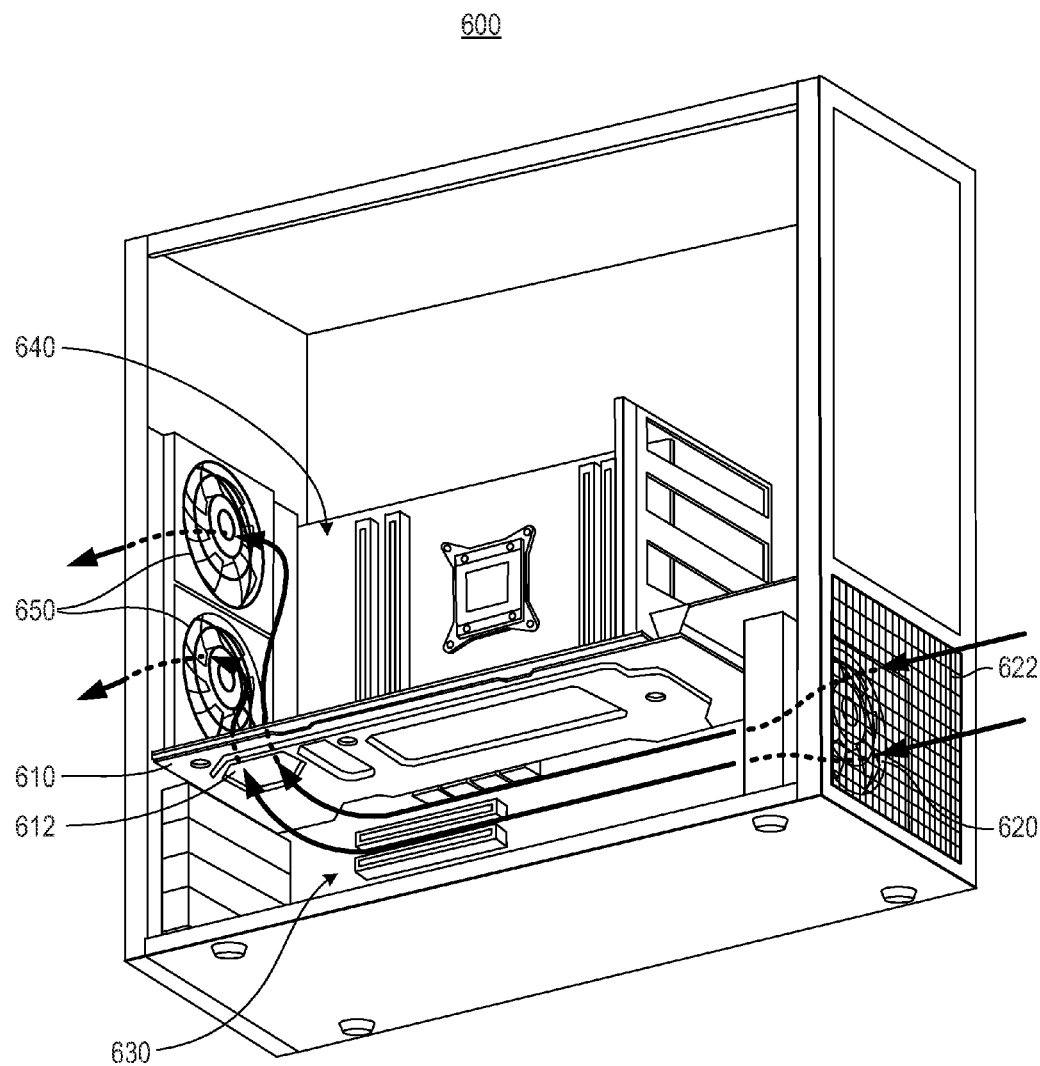
FIG. 6 illustrates a computer chassis with a daughterboard and tray installed to provide an airflow path, according to an example.

FIG. 6 illustrates a computer chassis with the daughterboard and tray installed to provide an airflow path, according to an example. Computer chassis 600 may be a chassis of any of various computers, such as a desktop computer, a workstation computer, a server computer, or the like. Chassis 600 may take many different forms and the one shown in FIG. 6 is merely an example. Additionally, chassis 600 may include many additional components other than those shown in FIG. 6.

The daughterboard and tray assembly 610 may correspond to the daughterboard and tray illustrated in FIG. 3. Chassis 600 may include guides or supports to secure the daughterboard and/or tray to the chassis. A fan and assembly as illustrated in FIGS. 4 and 5 may also be included. In such a case, for example, the fan and assembly may be located on the side of the daughterboard and tray assembly 610 which is in exhaust area 640 of chassis 600.

Chassis 600 may include an intake fan 620 and an intake fan grate 622. Intake fan 620 may be any of various fans, as previously described. Intake fan 620 may suck air from outside of the chassis 600 and propel the air to move through the chassis as shown by the arrows. The intake air may be used as cooling air to dissipate heat from the intake area 630, which may be a PCI card area for example. In some examples, intake area 630 may not be a PCI card area and may include other electronic components or devices that may similarly generate heat and benefit from cooling.

The intake air passing over the intake area 630 may additionally pass through the airflow path 612 in the daughterboard and tray assembly 610. By passing through the airflow path 612, the intake air may pass to an exhaust area 640 of chassis 600. Exhaust area 640 may include one or more exhaust fans 650. The exhaust fans 650 may suck air from the exhaust area 640 and propel it out of chassis 600. Accordingly, intake air that has heated up due to heat dissipation from various electronic components in intake area 630 and elsewhere may be expelled from the chassis 600. As a result, chassis 600 may be maintained at an appropriate temperature for safe operation of the various electronic components housed by chassis 600. Additionally, the speed of the various fans, such as the intake fan 620 and exhaust fans 650, may be reduced due to the improved airflow.

What is claimed is:

1. A computer chassis, comprising:
   a PCI card area;
   an intake fan to blow intake air across the PCI card area;
   an exhaust fan to evacuate air from the chassis;
   a daughterboard separating the PCI card area from the exhaust fan, wherein the daughterboard comprises an airflow path to permit the intake air to pass toward the exhaust fan, wherein the airflow path is provided by a cutout defined by an angled edge of the daughterboard, the angled edge being angled with respective to each of a horizontal portion and a vertical portion of the daughterboard, and wherein the daughterboard is positioned between the intake fan and the exhaust fan.

2. The computer chassis of claim 1, wherein the airflow path is provided by multiple openings, one of the openings including the cutout.

3. The computer chassis of claim 2, wherein the multiple openings comprise perforations spaced close together.

4. The computer chassis of claim 2, wherein the multiple openings comprise slots.

5. The computer chassis of claim 1, further comprising a motherboard, the daughterboard comprising a connector to connect to the motherboard.

6. The computer chassis of claim 5, wherein the daughterboard comprises a bottom edge having the connector to connect to the motherboard and a top edge opposite the bottom edge, the airflow path provided by the cutout created by the top edge angling toward the bottom edge.

7. The computer chassis of claim 6, wherein the top edge of the daughterboard angles toward the bottom edge for more than half the length of the daughterboard as measured in a direction from the top edge to the bottom edge.

8. The computer chassis of claim 1, further comprising a daughterboard tray configured to mount to the computer chassis and provide structural support to the daughterboard, the daughterboard tray comprising an opening to overlap the airflow path in the daughterboard.

9. The computer chassis of claim 1, further comprising a third fan located near the airflow path in the daughterboard.

10. A daughterboard comprising:
    a bottom edge, a top edge, and a side edge; and
    a connector on the bottom edge to connect to a motherboard,
    the top edge providing an airflow path provided by an angled portion of the top edge angling toward the bottom edge as the top edge approaches the side edge, wherein the top edge has a vertical portion preceding the angled portion, the vertical portion perpendicular to the bottom edge, the angled portion being angled with respect to each of the vertical portion and the bottom edge.

11. The daughterboard of claim 10, wherein the top edge has a flat portion that extends parallel to the bottom edge after the angled portion.

12. A computer comprising:
    a chassis;
    a heat generating device;
    an intake fan to blow air across the heat generating device;
    an exhaust fan to evacuate the air from the chassis;
    a daughterboard separating the heat generating device from the exhaust fan, wherein the daughterboard provides an airflow path to enable the air to pass toward the exhaust fan, wherein the airflow path is provided by a cutout defined by an angled edge of the daughterboard, the angled edge being angled with respective to each of a horizontal portion and a vertical portion of the daughterboard, and wherein the daughterboard is spaced apart from and positioned between the intake fan and the exhaust fan; and
    an additional fan to move the air through the airflow path and toward the exhaust fan after the air has passed over the heat generating device.

13. The computer of claim 12, wherein the additional fan is attached to the daughterboard or to a tray supporting the daughterboard.

14. The computer of claim 12, wherein the additional fan is attached to the daughterboard or to a tray supporting the daughterboard via an assembly.

15. The computer chassis of claim 1, wherein the daughterboard is spaced apart from each of the intake fan and the exhaust fan.

16. The computer chassis of claim 15, wherein the intake fan is on one side of the daughterboard, and the exhaust fan is on an opposite side of the daughterboard.

17. The computer of claim 12, wherein the intake fan is on one side of the daughterboard, and the exhaust fan is on an opposite side of the daughterboard.

* * * * *